United States Patent
Webber

(10) Patent No.: US 8,020,890 B2
(45) Date of Patent: Sep. 20, 2011

(54) APPARATUS AND METHOD FOR CONTROLLING AN INFLATABLE CUSHION

(75) Inventor: James L. Webber, Shelby Township, MI (US)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/577,686

(22) Filed: Oct. 12, 2009

(65) Prior Publication Data

US 2010/0090450 A1     Apr. 15, 2010

Related U.S. Application Data

(60) Provisional application No. 61/195,890, filed on Oct. 10, 2008.

(51) Int. Cl.
*B60R 21/239* (2006.01)
*B60R 21/2338* (2011.01)

(52) U.S. Cl. .............. 280/739; 280/742; 280/743.2

(58) Field of Classification Search ............ 280/743.2, 280/739, 743.1, 742
See application file for complete search history.

(56) References Cited

U.S. PATENT DOCUMENTS

| 6,270,115 | B1 | 8/2001 | Andreen et al. |
| 6,773,030 | B2 * | 8/2004 | Fischer ................. 280/739 |
| 6,832,778 | B2 * | 12/2004 | Pinsenschaum et al. ..... 280/739 |
| 6,932,385 | B2 * | 8/2005 | Hawthorn et al. .......... 280/739 |
| 7,275,763 | B2 * | 10/2007 | Thomas et al. ........... 280/743.2 |
| 2008/0185827 | A1 | 8/2008 | Webber et al. |
| 2008/0246261 | A1 | 10/2008 | Webber et al. |

* cited by examiner

*Primary Examiner* — Paul N Dickson
*Assistant Examiner* — Joseph Rocca
(74) *Attorney, Agent, or Firm* — Harness, Dickey & Pierce, P.L.C.

(57) ABSTRACT

A control device for modifying the deployment characteristics of an inflatable cushion of an airbag module is disclosed herein, the control device having a releasable retention device releasably secured to an inner surface of the inflatable cushion at a first location and an actuator at a second location, the releasable retention device being configured to limit deployment of the inflatable cushion in a first direction when the releasable retention device is secured to the first location of the inflatable cushion and the actuator; and a venting system disposed within and comprising a portion of the inflatable cushion, the venting system providing at least one vent opening in the inflatable cushion when the releasable retention device is secured to the first location of the inflatable cushion and the actuator and the inflatable cushion is inflated by an inflation gas.

12 Claims, 8 Drawing Sheets

Small Occupant Mode
Vents Open

Large Occupant Mode
Vents Closed

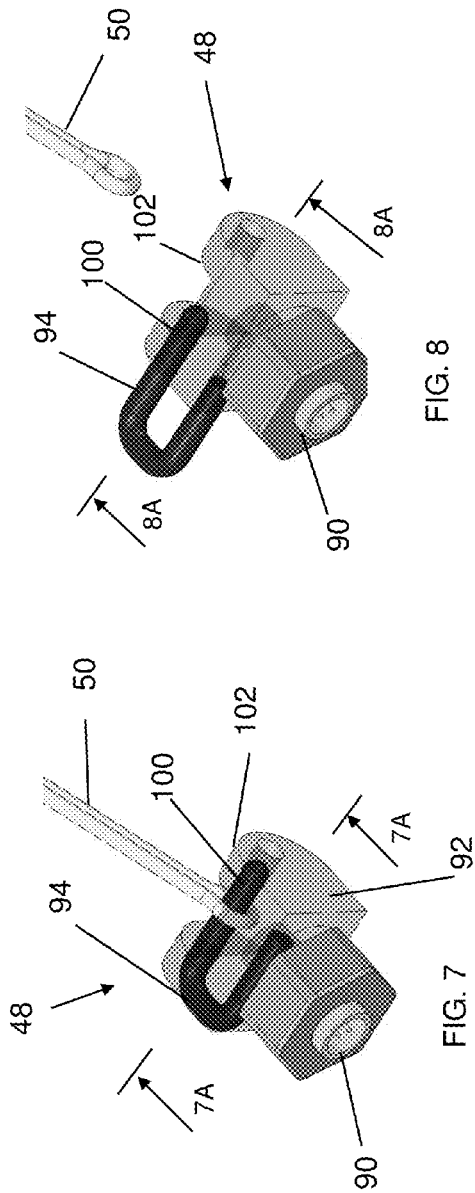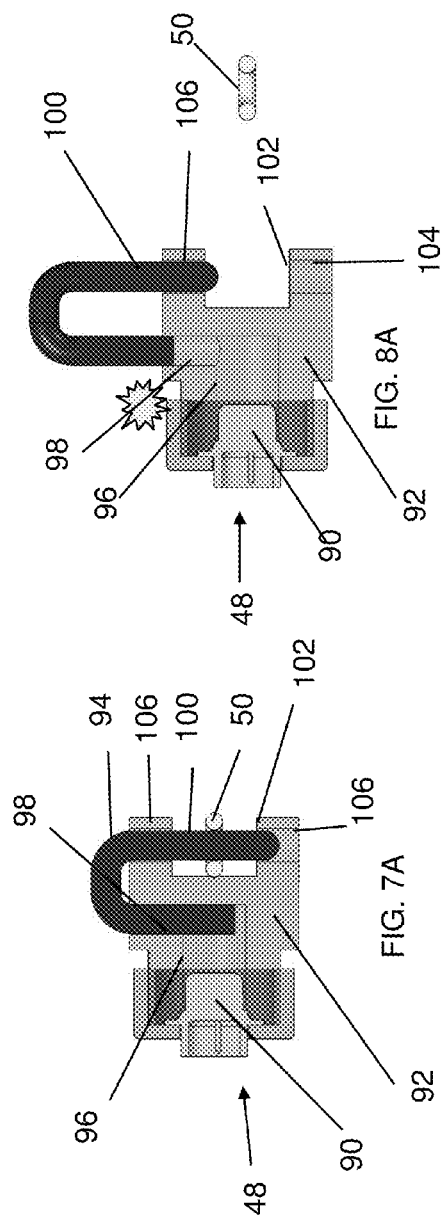

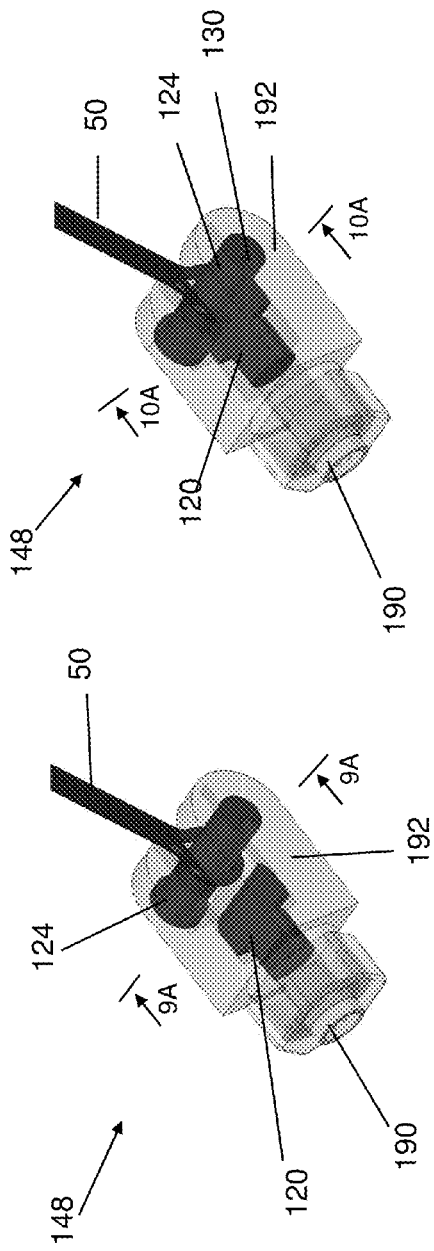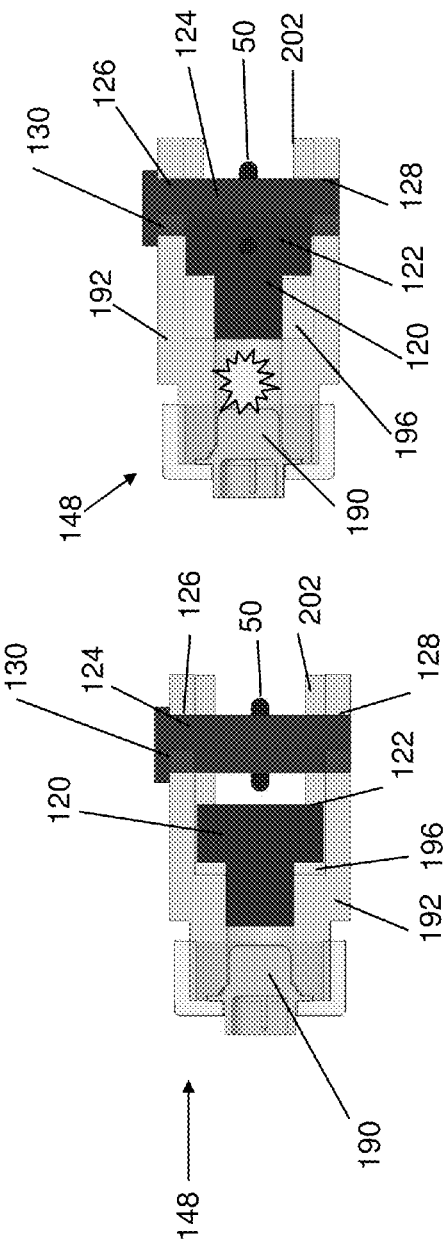

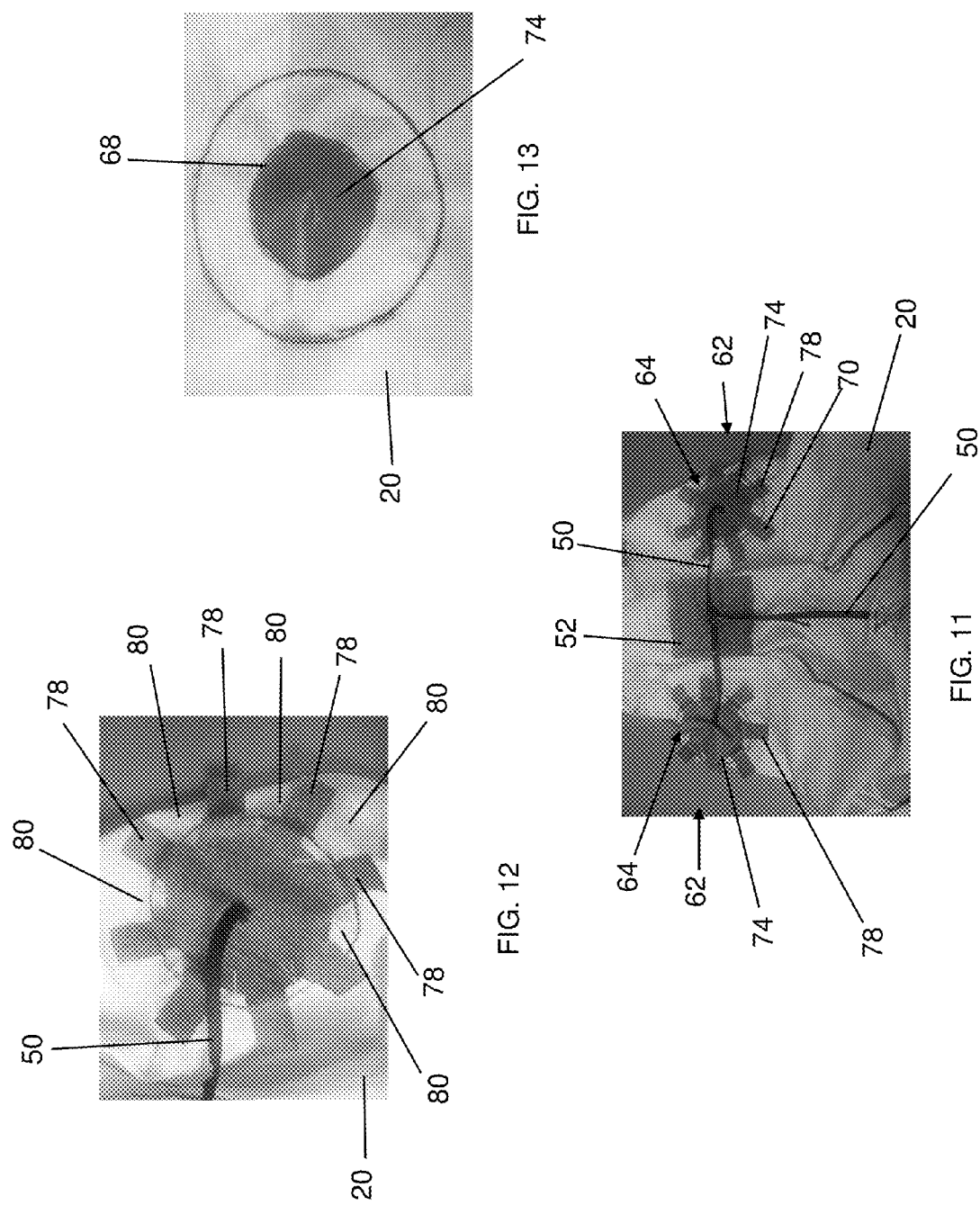

APPARATUS AND METHOD FOR CONTROLLING AN INFLATABLE CUSHION

CROSS REFERENCE TO RELATED APPLICATIONS

This application claims the benefit of U.S. Provisional Patent Application Ser. No. 61/195,890 filed Oct. 10, 2008, the contents of which are incorporated herein by reference thereto.

BACKGROUND

This present invention relates generally to airbags or inflatable cushions for vehicles. More specifically, the present invention relates to systems and methods for controlling the deployment of an inflatable cushion of an airbag module.

Airbag modules have become common in modern automobiles. An airbag module typically comprises an inflatable cushion and an inflator for deploying the inflatable cushion. The module is installed in a desired position within the vehicle, such as the steering wheel, the dashboard, the seat, vehicle doors, the A-pillar, and other locations. The inflatable cushion is stored in a folded position within a housing in fluid communication with the inflator. In response to an activation event or occurrence, a sensor provides a signal for activating the inflator. The inflator provides a supply of inflating gas to the cushion to inflate the cushion, deploying it from the housing into the vehicle.

Various methods have been employed to tie the inflation level of the inflatable cushion to specific conditions. Accordingly, it is desirable to provide an inflatable cushion and/or apparatus or system for controlling the deployment of the inflatable cushion in response to conditions proximate to the deploying inflatable cushion.

SUMMARY

Disclosed herein is a device and method for manipulating the deployment characteristics of an inflatable cushion of an airbag module.

In one exemplary embodiment, a control device for modifying the deployment characteristics of an inflatable cushion of an airbag module is provided, the control device having: a releasable retention device releasably secured to an inner surface of the inflatable cushion at a first location and an actuator at a second location, the releasable retention device being configured to limit deployment of the inflatable cushion in a first direction when the releasable retention device is secured to the first location of the inflatable cushion and the actuator; and a venting system disposed within and comprising a portion of the inflatable cushion, the venting system providing at least one vent opening in the inflatable cushion when the releasable retention device is secured to the first location of the inflatable cushion and the actuator and the inflatable cushion is inflated by an inflation gas.

In another exemplary embodiment, an airbag module is provided, the air bag module having: a housing; an inflatable cushion being configured for deployment from the housing; an inflator for inflating the inflatable cushion with an inflation gas, the inflator being in fluid communication with the inflatable cushion; a releasable retention device being releasably secured to an inner surface of the inflatable cushion at a first location and an actuator at a second location, the releasable retention device being configured to limit deployment of the inflatable cushion in a first direction when the releasable retention device is secured to the first location of the inflatable cushion and the actuator; and a venting system disposed within and comprising a portion of the inflatable cushion, the venting system maintaining at least one vent of the inflatable cushion in an open position when the releasable retention device is secured to the first location of the inflatable cushion and the actuator and the inflatable cushion is inflated by the inflation gas.

In another exemplary embodiment, a method for limiting deployment of an inflatable cushion in a first direction is provided, the method including the steps of securing a releasable retention device to an inner surface of the inflatable cushion at a first location, the releasable retention device being configured to limit deployment of the inflatable cushion in at least a first direction when the releasable retention device is secured to the first location of the inflatable cushion and an actuator configured for releasing the releasable retention device from the first location and the actuator; and venting an inflating gas of the inflatable cushion until the releasable retention device is released from the first location, wherein the inflating gas is vented through a venting system disposed within and comprising a portion of the inflatable cushion, the venting system providing at least one vent opening in the inflatable cushion when the releasable retention device is secured to the first location of the inflatable cushion and the actuator and the inflatable cushion is inflated by the inflation gas.

The above-described and other features of the present application will be appreciated and understood by those skilled in the art from the following detailed description, drawings, and appended claims.

DRAWINGS

FIG. 7 is a perspective view of a release mechanism in a first mode of operation in accordance with exemplary embodiments of the present invention;

FIG. 7A is a view along lines 7A-7A of FIG. 7;

FIG. 8 is a perspective view of a release mechanism in a second mode of operation in accordance with exemplary embodiments of the present invention;

FIG. 8A is a view along lines 8A-8A of FIG. 8;

FIG. 9 is a perspective view of a release mechanism of an alternative exemplary embodiment in a first mode of operation in accordance with exemplary embodiments of the present invention;

FIG. 9A is a view along lines 9A-9A of FIG. 9;

FIG. 10 is a perspective view of a release mechanism in an alternative exemplary embodiment in a second mode of operation in accordance with exemplary embodiments of the present invention;

FIG. 10A is a view along lines 10A-10A of FIG. 10;

FIGS. 11-12 are interior views of portions of an inflatable cushion in accordance with exemplary embodiments of the present invention; and FIG. 13 is an exterior view of a portion of an inflatable cushion in accordance with exemplary embodiments of the present invention.

DESCRIPTION OF EXEMPLARY
EMBODIMENTS

Disclosed herein is a method and apparatus for selectively controlling the deployment or inflation of an inflatable cushion of an airbag module through the use of a control device that operates to control the deployment characteristics of an inflatable cushion. In accordance with an exemplary embodiment, a dual mode air bag system is provided wherein the dual mode air bag system comprises a first mode tuned for a small occupant and a second mode tuned for a larger occupant, wherein the first mode is effective to constrict the cushion away from the occupant by increased venting of inflation gas allowing a seat belt to conduct the restraint function for stopping occupant chest motion, and the second mode is effective to allow a deep deployment of the cushion with decreased inflation gas venting.

In accordance with an exemplary embodiment of the present invention the control device comprises: a releasable retention device, wherein the releasable retention device is configured to limit deployment of the inflatable cushion in a first direction when the releasable retention device is releasably secured to an inner surface of the inflatable cushion at a first location and an actuator at a second location, the releasable retention device being configured to limit deployment of the inflatable cushion in a first direction when the releasable retention device is secured to the first location of the inflatable cushion and the actuator; and a venting system disposed within and comprising a portion of the inflatable cushion, the venting system providing at least one vent opening in the inflatable cushion when the releasable retention device is secured to the first location of the inflatable cushion and the actuator and the inflatable cushion is inflated by an inflation gas.

Reference is made to the following U.S. Pat. No. 6,270,115 and U.S. Patent Publication Nos. 2008/0246261 and 2008/0185827 the contents each of which is incorporated herein by reference thereto.

Figure 1:
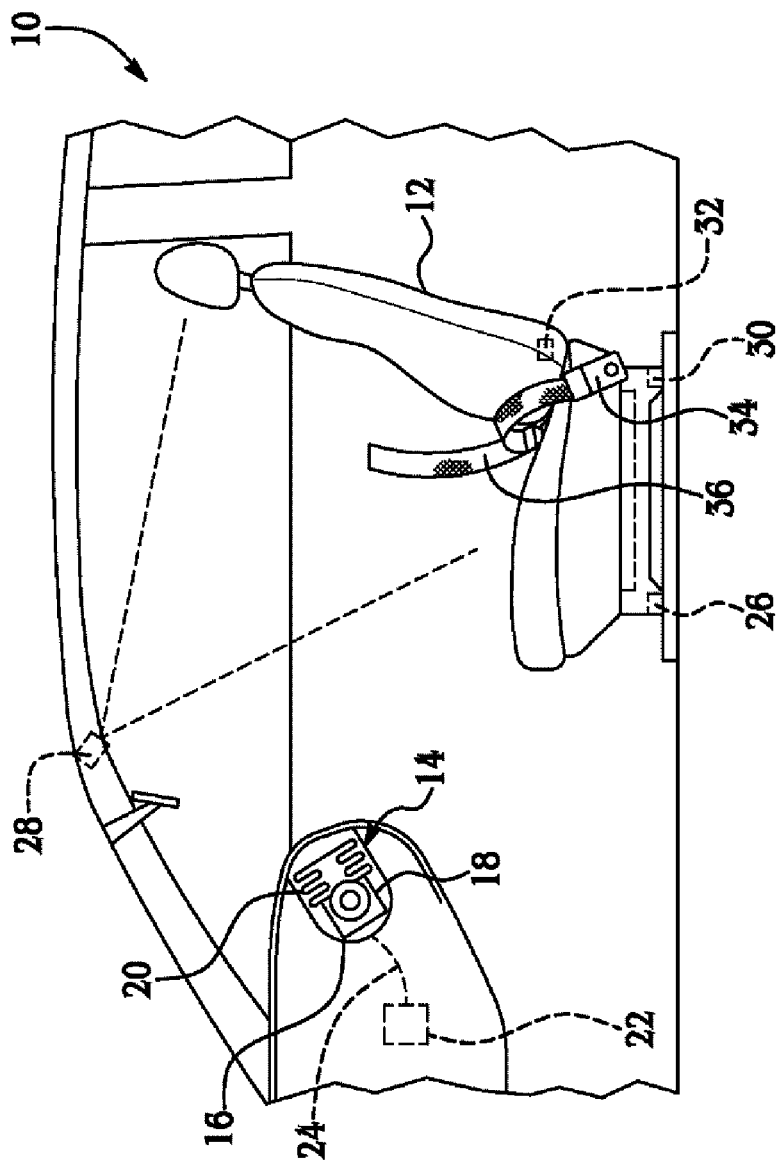
FIG. 1 is a partial view of a vehicle interior showing an inflatable cushion of a passenger side airbag module in a stored or un-deployed state.

Referring now to the FIGS. and in particular to FIG. 1 a portion of an interior of a vehicle 10 is illustrated. Included in the interior compartment of vehicle 10 is a seating structure 12 and an air bag module 14 disposed in a selected spatial relationship with respect to seating structure 12. The air bag module 14 comprises a housing 16, an inflator 18, and an inflatable air bag or cushion 20. The module 14 is positioned in the vehicle 10 for deployment of the cushion 20 towards the seating structure 12.

A sensor or sensing-and-diagnostic module 22 is adapted to detect an activation event wherein the occurrence of a threshold event will cause an activation signal 24 to be generated and received by the inflator 18, thereby causing the inflator to inflate the inflatable cushion. The detection of the threshold event is determined by one or more sensors that are disposed about the vehicle in accordance with known technologies. Thus, the activation signal 24 controls the activation of the airbag module 14. In an exemplary embodiment sensing-and-diagnostic module 22 comprises a microprocessor, microcontroller or other equivalent processing device capable of executing commands of computer readable data or program for executing a control algorithm that controls the operation of the airbag module. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the present invention can be implemented through computer-implemented processes and apparatuses for practicing those processes.

The inflatable cushion is stored in a folded or undeployed position in housing 16. The cushion is positioned to be in fluid communication with the inflator 18 wherein generation of the inflating gas will cause the cushion to inflate. Upon detection of an activation event by the sensing-and-diagnostic module 22, the inflator 18 is activated via signal 24 to generate the inflation gas. The inflation gas causes the cushion 20 to inflate and expand from housing 16 into the interior of the vehicle. It should be recognized that module 14 is illustrated by way of example only as being included in the dashboard of the vehicle. Of course, it is contemplated that module 14 can be installed for deployment in other regions of the vehicle, such as, but not limited to the steering wheel, the seat, the A-pillar, the roof, and other locations as well as other angular or positional relationships illustrated in FIG. 1. Moreover, the specific configurations of the vehicle interior, instrument panel, airbag module and relationship with regard to the same are provided as an example and it is, of course, understood that these configurations may vary from the specific configurations illustrated in FIG. 1.

Additionally, the present disclosure is also contemplated for use with various types of inflatable cushions and inflators. For example, cushions which are constructed and/or folded in a particular manner to achieve various deployment configurations and various types of inflators (e.g., dual stage inflators).

In addition, and in accordance with an exemplary embodiment of the present invention, the sensing-and-diagnostic module is also adapted to detect one or more conditions of the seating structure and/or the size of the occupant in the seating structure. For example, sensing-and-diagnostic module 22 can be adapted to detect one or more of the following: a load or amount of load (e.g., occupant weight) on the seating structure 12, a position of the seating structure, an angle of a portion of the seating structure with respect to another portion, the distance the seating structure is from the air bag module 14, and other data that is relevant to the deployment of the airbag by receiving input from a plurality of sensors disposed about the vehicle.

For example, the sensing-and-diagnostic module can receive inputs from one or more sensors such as, but not limited to, a seat position sensor 26, an optical scanner 28, a load sensor or weight sensor 30, a seat recline sensor 32, a seat belt use detection sensor (not shown), and a belt tensioning sensor 34. The sensors are positioned to provide input signals to module 22 indicative of one or more seat conditions and/or a size of an occupant in the seat. The one or more seat conditions can be combined with an occupant's size (e.g., weight determined by sensors) and inputted in a control algorithm resident upon a microprocessor disposed within the sensing and diagnostic module in order to determine a desired deployment scheme for the inflatable cushion (e.g., a first mode of deployment tuned for a small occupant or a second mode of deployment tuned for a larger occupant, as will be discussed herein). For example, the data inputs when compared to a look up table stored in the memory of the microprocessor or other readable format will allow the algorithm to determine whether a full deployment or partial deployment of the airbag is desired (e.g., tailoring of the airbag module by activating or not activating a control device or system designed to modify the cushion deployment characteristics) by employing the aforementioned first mode or second mode.

The continuous sampling of the various sensors allows the sensing and diagnostic module to be provided with various inputs before an activation event (deployment) occurs. It is noted that the airbag inflation system of the present disclosure is contemplated for use with any combination of the aforementioned sensors and it is not intended to be limited by the specific types of sensors discussed above.

In accordance with an exemplary embodiment of the present invention and referring now to FIGS. 2-8, a control device 38 for modifying the deployment characteristics of the inflatable cushion is illustrated. Control device 38 controls the deployment or inflation of the inflatable cushion by controlling the deployment characteristics of the inflatable cushion in order to provide at least two modes of deployment namely, a first mode tuned for a small occupants and a second mode tuned for a larger occupants. The first mode is effective to constrict a portion of the cushion away from the occupant by restraining a portion of the inflatable cushion with a release mechanism or restraint as well as increased venting of an inflation gas during the first mode.

The increased venting softens the inflatable cushion to make it soft enough to perform the function of occupant head restraint, which is necessary if a seat belt load limiting threshold for seat belt retractors or systems used with this airbag system is reduced however, when the low peak seat belt loads are provided there is a trade off against higher occupant travel distance and thus there may be a need for occupant head restraint by the inflatable cushion thus there is a desire for a softer cushion in this type of situation. Accordingly, the large cushion vents are opened during deployment in the small occupant mode thereby increasing the softness of the inflatable cushion when it is fully deployed in the small occupant mode.

In a second mode, the portion of the inflatable cushion is no longer restrained and the vent openings are sealed off thus, the second mode allows for a greater or larger amount of deployment of the inflatable cushion in a direction towards the occupant and vent openings of the inflatable cushion are also sealed during the second mode. Accordingly, the first mode allows a seat belt to conduct the restraint function for stopping an occupant's chest motion, and the second mode is effective to allow a deep deployment of the cushion towards the occupant with decreased inflation gas venting.

In accordance with an exemplary embodiment of the present invention, the control device has a releasable retention device 40 releasably secured to an inner surface 42 of the inflatable cushion proximate to a first location or forward leading edge or side 44 of the inflatable cushion. In one exemplary embodiment, the forward leading edge is the portion of the inflatable cushion that is configured to interact with a torso of an occupant positioned in front of the inflatable cushion. Thus, the releasable retention device 40 restricts or retards the movement of forward leading edge in the direction of arrow 46 and limits the deployment of the inflatable cushion in the direction of arrow 46 to a predetermined distance "X" illustrated in the attached FIGS.

The control device also has an actuator 48 located at a second location, wherein the actuator is configured to retain the control device in the first mode of operation wherein the releasable retention device is secured to the forward leading edge of the inflatable cushion and the actuator such that deployment of the inflatable cushion is limited to the predetermined distance "X" in the direction of arrow 46. In one exemplary embodiment, the releasable retention device is a tether, loop, cord of material 50 that is secured to the actuator at one end and looped around a securement feature or panel 52. In accordance with an exemplary embodiment, the tether or loop is made out of the same material as the inflatable cushion or any other material suitable for use in inflatable cushions and suitable for use in the actuator as will be discussed herein.

In one non-limiting configuration, securement feature 52 is a planar member comprising a flexible material, such as nylon or any other equivalent material including those used to manufacture inflatable cushions, secured to the inner surface 42 at two discrete locations 54 and 56 such that the restraining force of the releasable retention device at the forward leading edge of the inflatable cushion dispersed across the forward edge 44 in order to maximize the amount of surface area of the inflatable cushion that is being held back. In an exemplary embodiment, the securement feature is secured to the inner surface using any suitable securement means (e.g., stitching, adhesives, combinations thereof, etc.) and is configured and secured to the inflatable cushion at two discrete ends such that an opening 58 is provided for the loop of material 50 to pass therethrough. It being understood that any means for securing loop 50 to securement feature 52 is contemplated such as securing one end of the securement feature to location 54 placing loop 50 therein and then securing the other end of the securement feature to location 56. Alternatively, loop 50 can be secured to securement feature 53 after it is secured to the inflatable cushion by passing one end therethrough and securing it to the other to define loop 50 or loop 50 may simply be directly secured (e.g., sewn or any other suitable securement means) to securement feature 52 and/or connecting member 72 since actuator 48 is configured to release one end of loop or tether 50.

Figure 2:
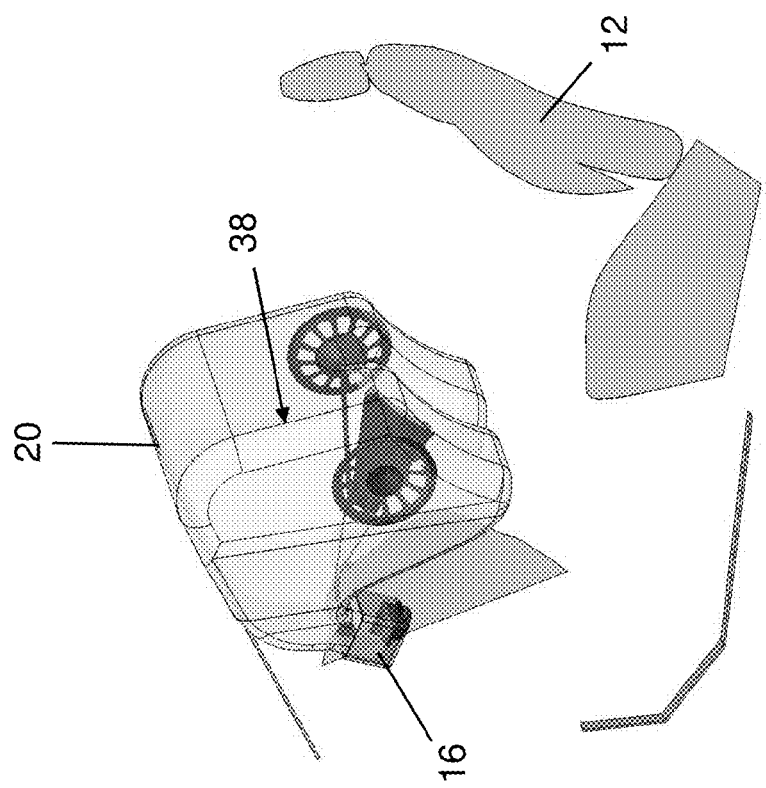
FIG. 2 is a partial view of a vehicle interior showing an inflatable cushion deployed in first mode of operation wherein the deployment of portions of the inflatable cushion are restricted and vents of the inflatable cushion are opened in accordance with exemplary embodiments of the present invention.
Figure 4:
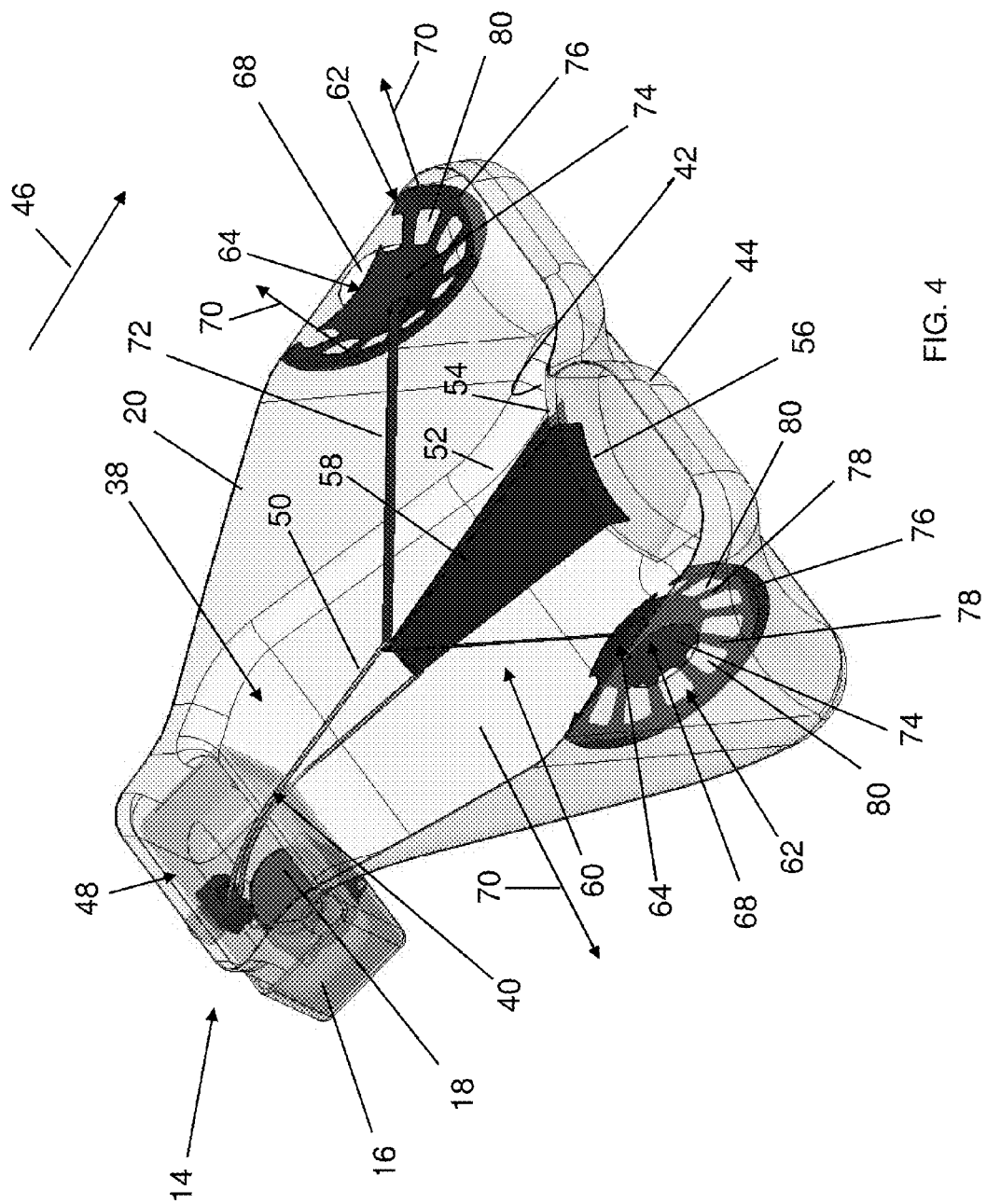
FIG. 4 is a partial cross-sectional perspective view of an inflatable cushion deployed in first mode of operation wherein the deployment of portions of the inflatable cushion are restricted and vents of the inflatable cushion are opened in accordance with exemplary embodiments of the present invention.

As illustrated in at least FIGS. 2 and 4 and when the control device is in the first mode, the effective length of the loop of material is such that when it is passed through opening 58 and secured to actuator 48 the deployment of the inflatable cushion in the direction of arrow 46 is limited to the predetermined distance "X".

In addition and in exemplary embodiment, the control device further comprises a venting system 60. The venting system is disposed within and comprises a portion of the side wall of the inflatable cushion. In the illustrated embodiment, the venting system has a pair of movable vents 62 disposed on opposite sides of the inflatable cushion, each being adjacent to the forward leading edge that is the portion of the inflatable cushion that is configured to interact with a torso of an occupant positioned in front of the inflatable cushion. Of course, these movable vents may be disposed on any surface of the inflatable cushion.

In accordance with an exemplary embodiment of the present invention, the venting system is capable of operating in an open vent mode corresponding to the first mode of the control device or a closed vent mode corresponding to the second mode of the control device. In the open vent mode, the vent openings are in fluid communication with the interior of the inflatable cushion when the inflatable cushion is sufficiently inflated such that an inflating gas can be vented therethrough. During the open vent mode the self-closing cushion vents are held closed by the differential pressure at initial inflation until the cushion has filled sufficiently to pull the restriction tether, loop or releasable retaining device tight thus causing the vents to open. Keeping the self-closing cushion vents closed during initial inflation or deployment allows the inflatable cushion to fill more quickly, since the majority of gas is retained until the inflatable cushion reaches its final shape then the releaseable retaining device is pulled taught and the vents are opened.

Conversely and in the closed vent mode, the vent openings are sealed and the inflating gas is not vented through the vent openings.

In one non-limiting configuration and as illustrated in the FIGS., each of the pair of movable vents has a sealing member 64 disposed over a respective opening 68 in the inflatable cushion, wherein each sealing member is configured for movement between a first sealing position (illustrated in at least FIGS. 3 and 5) wherein the sealing member covers the opening and essentially prevents fluid flow through the opening and a second open position (illustrated in at least FIGS. 2 and 4) wherein the sealing member is spaced away from the opening to provide a fluid path 70 between the sealing member and the inflatable cushion. In order to facilitate movement of the movable vents to the open position a connecting member 72 is secured to each of the pair of sealing members and the releasable retention device 40 comprising loop 50 is secured around the connecting member such that when the control device is in the first mode, the effective length of the loop of material is such that when it is passed around connecting member 72 and secured to actuator 48, connecting member is pulled in a direction opposite to arrow 46 and the length of the connecting member 72 and loop 50 is such that the sealing members 64 are pulled away from openings 68 and venting of the inflation gas through openings 68 is allowed to occur during inflation of the inflatable cushion. This configuration is at least illustrated in FIGS. 2 and 4.

Figure 3:
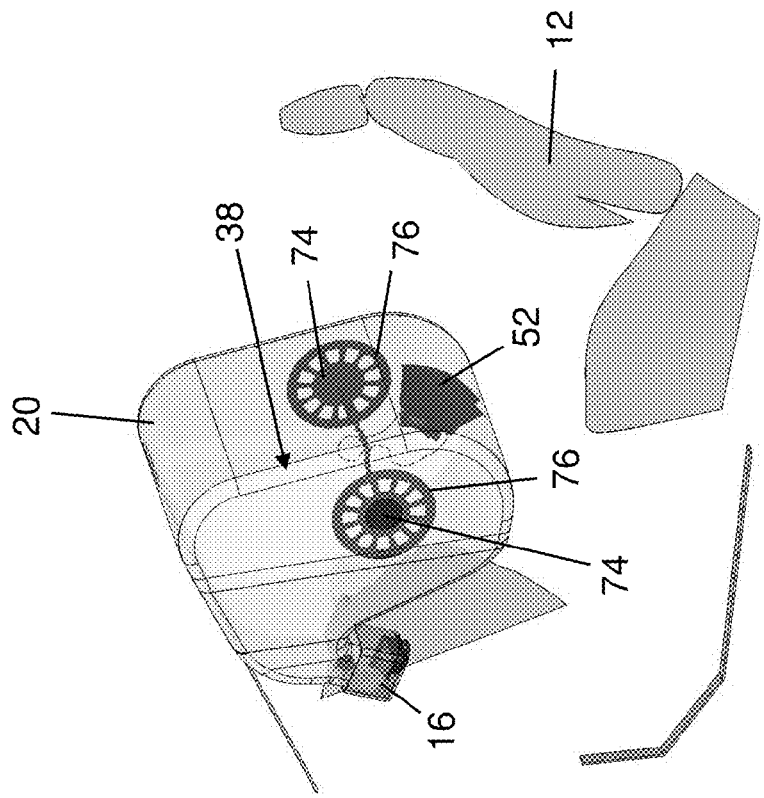
FIG. 3 is a partial view of a vehicle interior showing an inflatable cushion deployed in second mode of operation wherein the deployment of portions of the inflatable cushion are not restricted and vents of the inflatable cushion are sealed in accordance with exemplary embodiments of the present invention.
Figure 5:
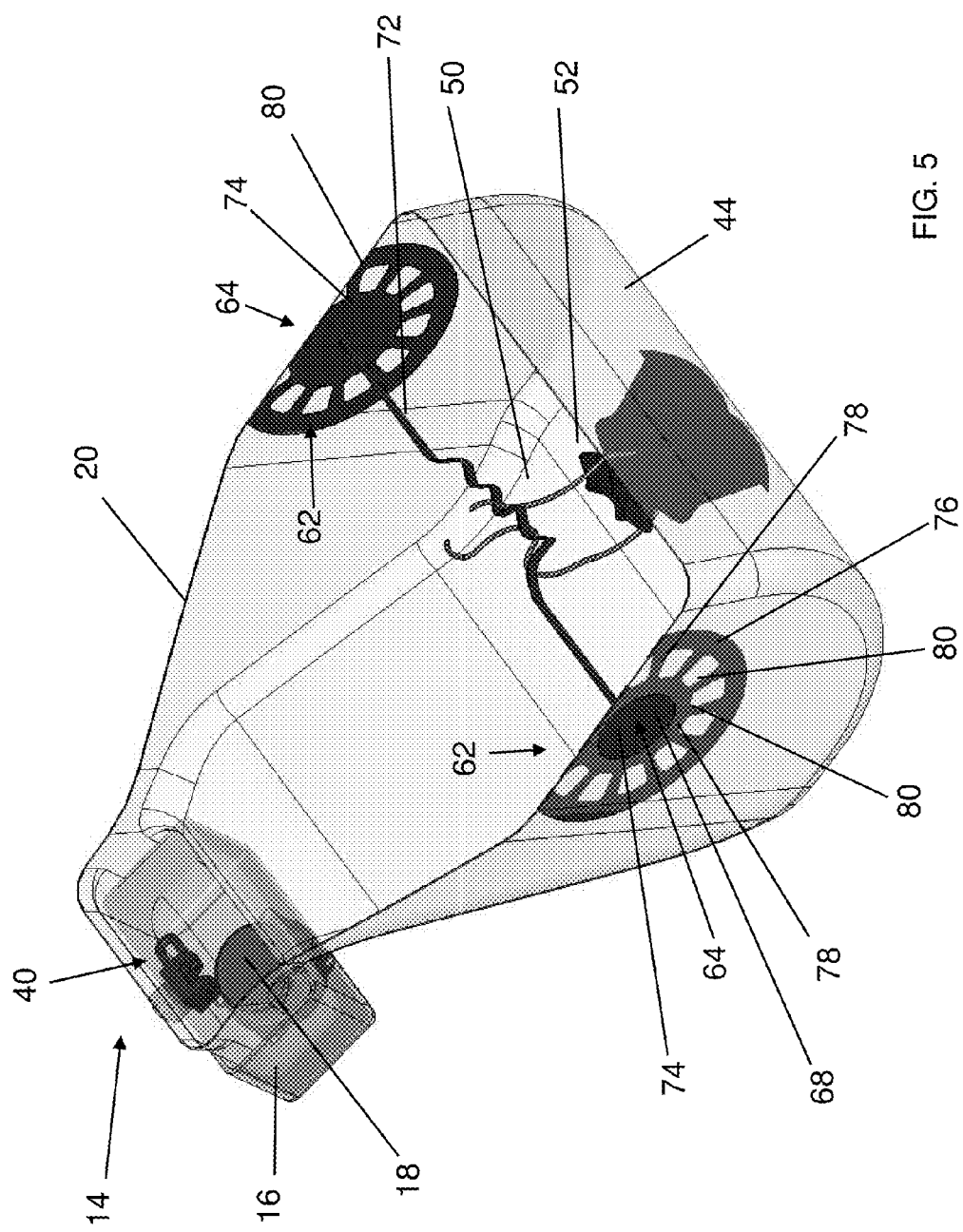
FIG. 5 is a partial cross-sectional perspective view of an inflatable cushion deployed in second mode of operation wherein the deployment of portions of the inflatable cushion are not restricted and vents of the inflatable cushion are sealed in accordance with exemplary embodiments of the present invention.
Figure 6A:
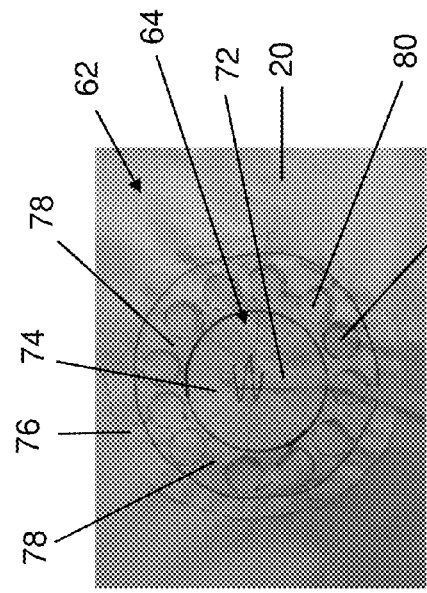
FIGS. 6A-6D are views illustrating venting members of the inflatable cushion in accordance with one exemplary embodiment of the present invention.
Figure 6B:
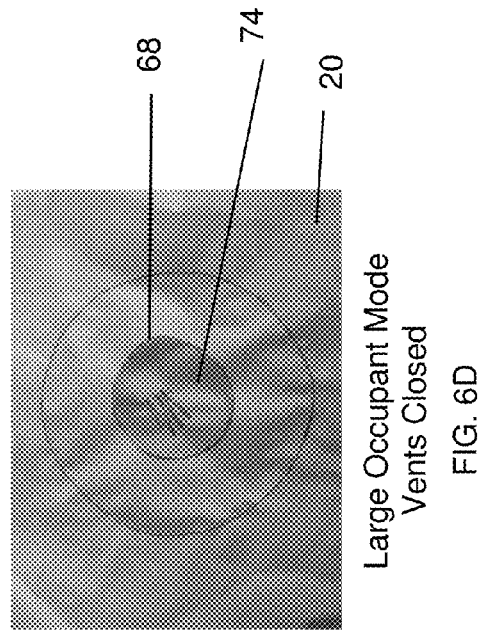
Figure 6C:
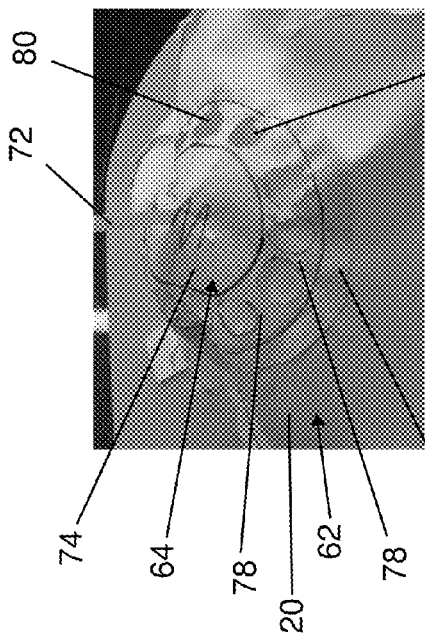
Figure 6D:
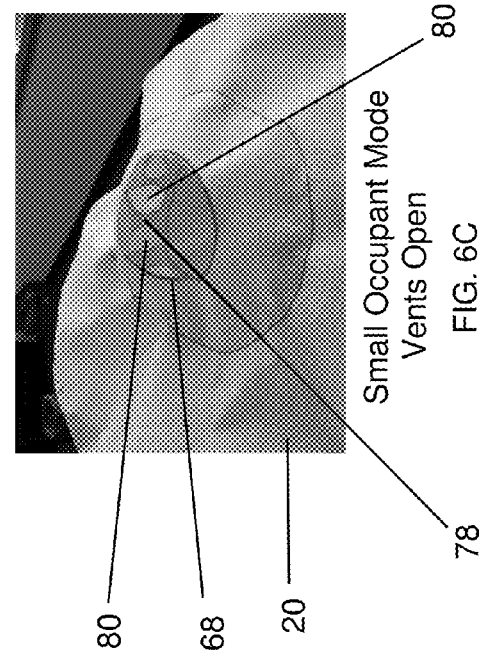

When the releasable retention device 40 or loop 50 is released by the actuator and as illustrated at least in FIGS. 3 and 5, the loop of material is released by the actuator and a force is no longer or not applied to the securement feature as well as connecting member 72 of the venting system such that the forward edge 44 can deploy more outwardly in the direction of arrow 46 and past the predetermined distance "X". Furthermore and since the connecting member will not pull the sealing members 64 away from openings 68 the same are now forced against the inner surface of the inflatable cushion and openings 68 are effectively sealed off due to the increased pressure in the inner cavity of the inflatable cushion.

Referring now to FIGS. 2-6D and in accordance with one non-limiting exemplary embodiment, each sealing member 64 has a first inner portion of material 74 configured to have an outer periphery larger than the opening it is covering. The sealing member also has an outer member 76 spaced from the first inner portion and secured to the inflatable cushion, the outer member surrounds the first inner portion and has an inner periphery that is larger than the outer periphery of the first inner portion. A plurality of connecting members 78 connect the outer member to the inner portion and are spaced from each other to provide a plurality of vent openings 80 through the sealing member. Accordingly and as the inner portion is pulled away from opening 68 by connecting member 72 vent openings 80 provide the fluid paths 70 from the interior of the inflatable cushion to the exterior of the inflatable cushion.

FIGS. 11-13 illustrate an alternative exemplary embodiment, wherein the sealing member is constructed without the outer member and the connecting members 78 are secured directly to the inflatable cushion.

Referring now to FIGS. 7-10A various embodiments of the actuator are illustrated. In one embodiment and as illustrated in FIGS. 7-8A actuator 48 has a pyrotechnic squib 90 secured to an actuator housing 92. Squib 90 is configured to be fired upon receipt of a signal from a sensing and diagnostic or control module 22 configured to receive and interpret signals from at least one sensor to determine the size of an occupant positioned in the seat in front of the airbag module thereby determining what mode the airbag device or airbag system is to operate in during airbag deployment. Non-limiting examples of such sensors providing signals to control module 22 are illustrated in FIG. 1. In accordance with an exemplary embodiment and if the control module 22 determines that a smaller sized occupant (e.g., small child, adolescent child or small adult under a predetermined height and weight parameter) is in the seat in front of the air bag module and an airbag deployment event is detected the inflatable cushion is deployed and the control device operates in a first deployment mode wherein the actuator is not activated and loop 50 is retained by the actuation device and the forward end of the cushion is restrained and the venting system is configured to allow venting from an interior of the inflatable cushion.

If on the other hand, the control module 22 determines that a larger sized occupant (e.g., adult or occupant over a predetermined height and weight parameter) is in the seat in front of the air bag module and an airbag deployment event is detected the inflatable cushion is deployed and the control device operates in a second deployment mode wherein the actuator is activated and loop 50 is no longer retained by the actuation device and the forward end of the cushion is not restrained and the venting system is configured to not allow venting from an interior of the inflatable cushion through the vent openings of the venting system.

As illustrated in FIGS. 7-8A a pin member or rod 94 is movably secured to the actuator housing for movement between a first position (FIGS. 8 and 7A) wherein the loop, cord or tether 50 is secured to the actuator housing and to a second position (FIGS. 8 and 8A), wherein the loop, cord or tether 50 is released from the actuator housing.

During activation of the pyrotechnic squib a fluid pressure within a chamber 96 of the actuator housing increases such that a portion of the pin in chamber 96 is slid along a passage 98 and a retaining portion 100 of the pin slides out of a slot 102 of the actuator housing and traverses to the second position thereby releasing loop 50. In one non-limiting exemplary embodiment, a portion of pin 94 is slidably received within openings 104 and 106 disposed on either side of slot 102.

Accordingly, the actuator acts like a cord release mechanism that uses squib pressure to push a pin, rod, or piston out of the body mechanism or housing. In one illustrated embodiment, the rod is "U" shaped and one leg of the "U" is used to hold the tether firmly attached to the actuator housing. When the rod is moved, the rod pulls out of the housing, stripping the cord loop from the rod and releasing it for travel.

In an alternative embodiment and as illustrated in FIGS. 9-10A an alternative actuator is illustrated here component part performing similar or analogous features are labeled in multiples of 100. In this embodiment, actuator 148 has a pyrotechnic squib 190 secured to an actuator housing 192. Similar to the previous embodiment, squib 190 is configured to be fired upon receipt of a signal from a sensing and diagnostic or control module 22 configured to receive and interpret signals from at least one sensor to determine the size of an occupant positioned in the seat in front of the airbag module. Non-limiting examples of such sensors providing signals to control module 22 are illustrated in FIG. 1. In accordance with an exemplary embodiment and if the control module 22 determines that a smaller sized occupant (e.g., small child, adolescent child or small adult under a predetermined height and weight parameter) is in the seat in front of the air bag module and an airbag deployment event is detected, the inflatable cushion is deployed and the control device operates in a first deployment mode wherein the actuator is not activated and loop 50 is retained by the actuation device and the forward end of the cushion is restrained and the venting system is configured to allow venting from an interior of the inflatable cushion.

If on the other hand, the control module 22 determines that a larger sized occupant (e.g., adult or occupant over a predetermined height and weight parameter) is in the seat in front of the air bag module and an airbag deployment event is detected the inflatable cushion is deployed and the control device operates in a second deployment mode wherein the actuator is activated and loop 50 is no longer retained by the actuation device and the forward end of the cushion is not restrained and the venting system is configured to not allow venting from an interior of the inflatable cushion through the vent openings of the venting system.

In this embodiment, the actuator or release mechanism is a cord or loop cutter wherein the squib gas pressure pushes a piston on which a blade is attached. The blade is forced though the cord into a recess in the retention pin and the cleaved cord end is then set free thereby allowing the inflatable cushion to operate in the large occupant mode.

As illustrated in FIGS. 9-10A a cutting member is movably secured to the actuator housing for movement between a first position (FIGS. 9 and 9A) wherein the loop, cord or tether 50 is secured to the actuator housing to a second position (FIGS. 10 and 10A), wherein the loop, cord or tether 50 is released from the actuator housing.

During activation of the pyrotechnic squib a fluid pressure within a chamber 196 of the actuator housing increases such that the cutting member is slid within chamber 196 and a cutting edge portion 122 of the cutting member engages a portion of the loop surrounded and secured into a slot 202 of the housing by a pin 124. Here the cutting edge makes contact with the pin 124 a portion the loop sandwiched in between is cut and thus released from the housing. In one non-limiting exemplary embodiment, pin 124 is slidably received within openings 126 and 128 disposed on either side of slot 202. Thus, loop 50 is easily secured to the housing during assembly and manufacture by placing loop 50 in slot 202 and then sliding pin 124 therein. Thereafter, pin 124 may be fixedly secured to housing 192 by any suitable securement process (e.g., cold forming, interference fit, pinning, etc.). In another alternative exemplary embodiment, a surface of pin 124 is configured to have a slot, ledge, shoulder or opening 130 configured to receive the cutting edge of the cutting member therein to facilitate the cutting of loop 50.

As disclosed herein the releasable retention device retards or restricts a first portion or leading edge of the inflatable cushion that would, due to the kinematics of the inflatable cushion, be the first portion of the inflatable cushion to deploy away from the airbag module and towards an occupant of the vehicle.

Accordingly, exemplary embodiments of the present invention are directed to a control device disposed within or at least disposed partially within an inflatable cushion, wherein the control device comprises a releasable retention device configured to limit the deployment of the inflatable cushion in at least a first direction, the releasable retention device being releasably secured to an inner surface of the inflatable cushion at a first location, and actuating in response to a sensor, sensors or sensing device configured to detect the sixe of the occupant in front of the inflatable cushion and for providing a signal to an actuator for releasing the releasable retention device from the actuator and/or the first location.

Furthermore, the air bag module comprises a means to customize or tailor the inflation level and venting of the inflatable cushion. The inflation level is commensurate with the deployment range of the inflatable cushion. More specifically, venting or lack thereof of inflation gas through an opening in the housing is determined by a fully inflated cushion 20 or a partially restrained cushion 20. The inflatable cushion is made of a fabric material such as nylon or polyester as is known in the art.

Accordingly, exemplary embodiments of the present invention provide a dual mode air bag system for a front passenger seat occupant. The dual mode air bag system comprises a small occupant mode focused on the protection of small occupants, and a large occupant mode focused on the protection of larger occupants. Typically, the small occupant is a child and the large occupant is an adult. The dual mode air bag system default mode is the small occupant mode for protection of small occupants. Upon deployment of the air bag system in the first mode, the inflatable cushion is constricted in depth and has very large open cushion vents for venting a large amount of inflation gas. If however, the appropriate signal is received, the air bag system then deploys in the large occupant mode, wherein deployment of the dual air bag system in the large occupant mode, has a deep depth and small cushion vents venting a decreased amount of inflation gas. The dual mode air bag system transforms from the small occupant mode to the large occupant mode by activating an air bag initiator with the air bag control unit.

The small occupant mode is in one embodiment specifically optimized to achieve a high rating for a frontal crash test for an occupant in a passenger seat. In the small occupant mode, the chest region of the inflatable cushion is constricted or pulled away from the occupant. With the inflatable cushion pulled away from the small occupant, the seat belt effectively does the restraint work of stopping the chest motion, or chest deflection, of the small occupant. Chest deflection is one of the criteria used to determine a star rating in U.S. government testing.

In order to have low peak chest motion, or chest deflection of the small occupant, the peak force from the combination of the seat belt restraint and air bag restraint needs to be minimized Testing has determined that a very low seat belt load limit (1.0-1.5 kilonewtons) is required to achieve a chest deflection low enough for a 4 or 5 star rating in U.S. government crash testing. The 1.0-1.5 kilonewton load is very low compared to current seat belt load limiters and is not enough to adequately restrain larger occupants.

If the inflatable cushion adds loading to the small occupant's chest, the seat belt load limiter would need to be even lower to balance out the additional force.

The dual mode air bag system shifts between small occupant mode and large occupant mode utilizing a pyrotechnically-activated, cord release mechanism. In the small occupant mode, the cord, or tether, is retained during inflator activation. The cord pulls back on the chest portion of the cushion limiting the cushion depth. Additionally, the cord pulls two self-closing cushion vents to an open position that drastically increases cushion venting. The self-closing cushion vents are held closed by differential pressure at initial inflation until the cushion has filled sufficiently to pull the restriction tether tight thus causing the vents to open. Keeping the self-closing cushion vents closed allows the inflatable cushion to fill more quickly, since the majority of gas is retained until the inflatable cushion reaches its final shape. In the large occupant mode, both the inflator and the cord release mechanism are activated. The released cord does not restrict the cushion depth, and the self-closing cushion vents remain sealingly closed due to inflatable cushion pressure. The cord release mechanism is independent of the inflator, thereby allowing the choice to select the least costly inflator required for a given vehicle application. The cord release mechanism is attached to the air bag module housing by a squib installation nut.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control device for modifying the deployment characteristics of an inflatable cushion of an airbag module, the control device comprising:
    a releasable retention device releasably secured to an inner surface of the inflatable cushion at a first location and an actuator at a second location, the releasable retention device being configured to limit deployment of the inflatable cushion in a first direction when the releasable retention device is secured to the first location of the inflatable cushion and the actuator;
    a venting system disposed within and comprising a portion of the inflatable cushion, the venting system providing at least one vent opening in the inflatable cushion when the releasable retention device is secured to the first location of the inflatable cushion and the actuator and the inflatable cushion is inflated by an inflation gas;
    a pair of sealing members each being disposed over a respective opening in the inflatable cushion, each sealing member being configured for movement between a first sealing position wherein the sealing member covers the opening and essentially prevents fluid flow through the opening and a second open position wherein the sealing member is spaced away from the opening to provide a fluid path between the sealing member and the inflatable cushion; and
    a connecting member secured to each of the pair of sealing members and the releasable retention device, the connecting member being configured to move the sealing members from the first sealing position towards the second open position when the inflatable cushion is inflated by the inflation gas and when the releasable retention device is secured to the first location of the inflatable cushion and the actuator;
    wherein the releasable retention device is secured to the first location of the inflatable cushion via a securement feature, wherein the releasable retention device is loop of material looped around the connecting member, the securement feature and the actuator, and wherein the actuator is configured to release the loop of material from the actuator thereby releasing the loop from the connecting member and the securement feature.

2. The control device as in claim 1, wherein the securement feature is a planar member having at least two edges secured to the first location at different positions in order to disperse a restraining force provided by the releasable retention device at the first location when the inflatable cushion is inflated by the inflation gas and the releasable retention device is secured to the securement feature and the actuator.

3. The control device as in claim 1, wherein each sealing member comprises:
    a first inner portion of material configured to have an outer periphery larger than the opening it is covering;
    an outer member spaced from the first inner portion and secured to the inflatable cushion, the outer member surrounding the first inner portion and having an inner periphery larger than the outer periphery of the first inner portion; and
    a plurality of connecting members each being spaced from each other and each having a portion connected to the outer member and the first inner portion to provide a plurality of vent openings through the sealing member.

4. The control device as in claim 1, wherein the actuator comprises:
    a pyrotechnic squib secured to an actuator housing; and
    a pin member movably secured to the actuator housing for movement between a first position and a second position, wherein the cord is secured to the actuator housing when the pin is in the first position and wherein the cord is released from the actuator housing when the pin is in the second position; and
    wherein actuation of the pyrotechnic squib increases a fluid pressure within a chamber of the actuator housing in order to move the pin from the first position to the second position.

5. The control device as in claim 1, wherein the first location is a forward leading portion of the inflatable cushion configured to interact with a torso of an occupant and wherein the at least one opening of the venting system is located at a side edge of the inflatable cushion remote from the leading edge.

6. The control device as in claim 1, wherein the first location is a forward leading portion of the inflatable cushion.

7. An air bag module, comprising:
    a housing;
    an inflatable cushion being configured for deployment from the housing;
    an inflator for inflating the inflatable cushion with an inflation gas, the inflator being in fluid communication with the inflatable cushion;
    a releasable retention device being releasably secured to an inner surface of the inflatable cushion at a first location and an actuator secured to the housing at a second location, the releasable retention device being configured to limit deployment of the inflatable cushion in a first direction when the releasable retention device is secured to the first location of the inflatable cushion and the actuator;

a venting system disposed within and comprising a portion of the inflatable cushion, the venting system maintaining at least one vent of the inflatable cushion in an open position when the releasable retention device is secured to the first location of the inflatable cushion and the actuator and the inflatable cushion is inflated by the inflation gas;

a pair of sealing members each being disposed over a respective opening in the inflatable cushion, each sealing member being configured for movement between a first sealing position wherein the sealing member covers the opening and essentially prevents fluid flow through the opening and a second open position wherein the sealing member is spaced away from the opening to provide a fluid path between the sealing member and the inflatable cushion; and a connecting member secured to each of the pair of sealing members and the releasable retention device, the connecting member being configured to move the sealing members from the first sealing position towards the second open position when the inflatable cushion is inflated by the inflation gas and when the releasable retention device is secured to the first location of the inflatable cushion and the actuator;

wherein the releasable retention device is secured to the first location of the inflatable cushion via a securement feature, wherein the releasable retention device is loop of material looped around the connecting member, the securement feature and the actuator, and wherein the actuator is configured to release the loop of material from the actuator thereby releasing the loop from the connecting member and the securement feature.

8. The airbag module as in claim 7, wherein the securement feature is a planar member having at least two edges secured to the first location at different positions in order to disperse a restraining force provided by the releasable retention device at the first location when the inflatable cushion is inflated by the inflation gas and the releasable retention device is secured to the securement feature and the actuator and wherein the first location is a forward leading portion of the inflatable cushion configured to interact with a torso of an occupant and wherein the openings in the inflatable cushion are located at opposite sides of the inflatable cushion remote from the leading edge.

9. The airbag module as in claim 7, wherein each sealing member comprises:

a first inner portion of material configured to have an outer periphery larger than the opening it is covering;

an outer member spaced from the first inner portion and secured to the inflatable cushion, the outer member surrounding the first inner portion and having an inner periphery larger than the outer periphery of the first inner portion; and a plurality of connecting members each being spaced from each other and each having a portion connected to the outer member and the first inner portion to provide a plurality of vent openings through the sealing member.

10. The airbag module as in claim 7, wherein the pair of sealing members are each disposed on opposite sides of the inflatable cushion and wherein the first location is a forward leading portion of the inflatable cushion.

11. A control device for modifying the deployment characteristics of an inflatable cushion of an airbag module, the control device comprising:

a releasable retention device releasably secured to an inner surface of the inflatable cushion at a first location and an actuator at a second location, the releasable retention device being configured to limit deployment of the inflatable cushion in a first direction when the releasable retention device is secured to the first location of the inflatable cushion and the actuator;

a venting system disposed within and comprising a portion of the inflatable cushion, the venting system providing at least one vent opening in the inflatable cushion when the releasable retention device is secured to the first location of the inflatable cushion and the actuator and the inflatable cushion is inflated by an inflation gas;

a pair of sealing members each being disposed over a respective opening in the inflatable cushion, each sealing member being configured for movement between a first sealing position wherein the sealing member covers the opening and essentially prevents fluid flow through the opening and a second open position wherein the sealing member is spaced away from the opening to provide a fluid path between the sealing member and the inflatable cushion, each sealing member including a first inner portion of material, an outer member and a plurality of connecting members, the first inner portion of material configured to have an outer periphery larger than the opening it is covering, the outer member spaced from the first inner portion and secured to the inflatable cushion, the outer member surrounding the first inner portion and having an inner periphery larger than the outer periphery of the first inner portion, the plurality of connecting members each being spaced from each other and each having a portion connected to the outer member and the first inner portion to provide a plurality of vent openings through the sealing member; and a connecting member secured to each of the pair of sealing members and the releasable retention device, the connecting member being configured to move the sealing members from the first sealing position towards the second open position when the inflatable cushion is inflated by the inflation gas and when the releasable retention device is secured to the first location of the inflatable cushion and the actuator;

wherein the releasable retention device is secured to the first location of the inflatable cushion via a securement feature.

12. An air bag module, comprising:

a housing;

an inflatable cushion being configured for deployment from the housing;

an inflator for inflating the inflatable cushion with an inflation gas, the inflator being in fluid communication with the inflatable cushion;

a releasable retention device being releasably secured to an inner surface of the inflatable cushion at a first location and an actuator secured to the housing at a second location, the releasable retention device being configured to limit deployment of the inflatable cushion in a first direction when the releasable retention device is secured to the first location of the inflatable cushion and the actuator;

a venting system disposed within and comprising a portion of the inflatable cushion, the venting system maintaining at least one vent of the inflatable cushion in an open position when the releasable retention device is secured to the first location of the inflatable cushion and the actuator and the inflatable cushion is inflated by the inflation gas;

a pair of sealing members each being disposed over a respective opening in the inflatable cushion, each sealing member being configured for movement between a first sealing position wherein the sealing member covers the opening and essentially prevents fluid flow through the opening and a second open position wherein the sealing member is spaced away from the opening to provide a fluid path between the sealing member and the inflatable cushion, each sealing member including a first inner portion of material, an outer member and a plurality of connecting members, the first inner portion of material configured to have an outer periphery larger than the opening it is covering, the outer member spaced from the first inner portion and secured to the inflatable cushion, the outer member surrounding the first inner portion and having an inner periphery larger than the outer periphery of the first inner portion, the plurality of connecting members each being spaced from each other and each having a portion connected to the outer member and the first inner portion to provide a plurality of vent openings through the sealing member; and a connecting member secured to each of the pair of sealing members and the releasable retention device, the connecting member being configured to move the sealing members from the first sealing position towards the second open position when the inflatable cushion is inflated by the inflation gas and when the releasable retention device is secured to the first location of the inflatable cushion and the actuator.

* * * * *